United States Patent
Wu

(10) Patent No.: US 7,984,565 B2
(45) Date of Patent: Jul. 26, 2011

(54) MEASURING INSTRUMENT

(75) Inventor: Daniel Wu, Tainan (TW)

(73) Assignee: KMC Chain Industrial, Co., Ltd., Tainan Hsien (TW)

( * ) Notice: Subject to any disclaimer, the term of this patent is extended or adjusted under 35 U.S.C. 154(b) by 37 days.

(21) Appl. No.: 12/645,632

(22) Filed: Dec. 23, 2009

(65) Prior Publication Data
US 2010/0162583 A1    Jul. 1, 2010

(30) Foreign Application Priority Data
Dec. 29, 2008 (TW) .................. 97151207 A

(51) Int. Cl.
*G01B 5/14* (2006.01)

(52) U.S. Cl. ............ 33/811; 33/679.1; 73/828; 116/208

(58) Field of Classification Search ............ 33/783, 33/784, 787, 788, 810–813, 815, 816, 818–821, 33/823–825, 827, 828, 831–833, 710, 501.06, 33/501.08, 501.09, 501.6, 202; 73/828, 829; 116/208
See application file for complete search history.

(56) References Cited

U.S. PATENT DOCUMENTS

| | | | | |
|---|---|---|---|---|
| 3,190,006 A * | 6/1965 | Madeira | ............ | 33/610 |
| 4,092,781 A * | 6/1978 | Blake | ............ | 33/812 |
| 4,151,652 A * | 5/1979 | Palma | ............ | 33/679.1 |
| 4,365,420 A * | 12/1982 | Walden | ............ | 33/202 |
| 5,412,878 A * | 5/1995 | Edman | ............ | 33/810 |
| 5,694,697 A * | 12/1997 | Curtis | ............ | 33/203 |
| 5,983,515 A * | 11/1999 | Brinker et al. | ............ | 33/810 |
| 6,098,301 A * | 8/2000 | Kapphahn | ............ | 33/492 |
| 6,178,824 B1 * | 1/2001 | Hayakawa et al. | ............ | 73/828 |
| 6,957,498 B2 * | 10/2005 | Tsai | ............ | 33/610 |

* cited by examiner

*Primary Examiner* — Amy Cohen Johnson
(74) *Attorney, Agent, or Firm* — Hunton & Williams LLP

(57) ABSTRACT

A measuring instrument includes a ruler unit including an elongated plank portion extending along a first direction, two spaced apart positioning members disposed fixedly on the elongated plank portion, and a first measuring portion extending from the elongated plank portion along a second direction. A movable seat is movably mounted on the elongated plank portion and is movable relative to the elongated plank portion along the first direction between a reset position, where the movable seat abuts against one of the positioning members, and a normal position, where the movable seat abuts against the other one of the positioning members. The movable seat has a second measuring portion. A resilient member is mounted between the movable seat and the ruler unit, and biases the movable seat toward the normal position.

10 Claims, 7 Drawing Sheets

US 7,984,565 B2

MEASURING INSTRUMENT

CROSS-REFERENCE TO RELATED APPLICATION

This application claims priority of Taiwanese Application No. 097151207, filed on Dec. 29, 2008.

BACKGROUND OF THE INVENTION

1. Field of the Invention

This invention relates to a measuring instrument, more particularly to a measuring instrument adapted to measure a chain.

2. Description of the Related Art

Referring to FIGS. 1 and 2, a chain 100 adapted to be mounted on a bicycle (not shown) comprises a plurality of spaced apart meshing spaces 101, a plurality of outer chain plates 103, a plurality of inner chain plates 104 each abutting against two adjacent ones of the outer chain plates 103, and a plurality of chain rollers 102 each extending through two of the outer chain plates 103 and two of the inner chain plates 104. The chain rollers 102 tend to wear out due to engagement of teeth of a sprocket (not shown) with the meshing spaces 101. Wearing of the chain rollers 102 results in an increase in total length of the chain 100 during use of the bicycle. Hence, the sprocket teeth cannot mesh with the meshing spaces 102 in a tight fitting manner, thereby affecting adversely smooth transmission of force.

A conventional measuring instrument 11 is adapted to measure such change in the total length of the chain 100. The measuring instrument 11 has spaced apart first and second measuring portions 111, 112. The distance between the first and second measuring portions 111, 112 is fixed and is equal to an allowed maximum distance between two selected ones of the meshing spaces 101 of the chain 100 when the chain 100 is stretched to a maximum allowable extent.

When it is desired to measure the chain 100, the first measuring portion 111 is first inserted into a first selected one of the meshing spaces 101 of the chain 100. Afterwards, the second measuring portion 112 is tried to be inserted into a second selected one of the meshing spaces 101 of the chain 100. If the second measuring portion 112 can be inserted fully into the second selected meshing hole 101, a user can realize that the chain 100 is excessively long. However, the user cannot realize the difference between actual total length and standard total length of the chain 100 from the measurement of the conventional measuring instrument 11.

SUMMARY OF TEE INVENTION

Therefore, the object of the present invention is to provide a measuring instrument adapted to measure a chain and capable of alleviating the above drawback of the prior art.

Accordingly, a measuring instrument of the present invention is adapted to measure a chain, and includes a ruler unit, a movable seat, and a resilient member. The ruler unit includes an elongated plank portion extending along a first direction, two spaced apart positioning members disposed fixedly on the elongated plank portion, and a first measuring portion extending from the elongated plank portion along a second direction different from the first direction. The movable seat is movably mounted on the elongated plank portion and is movable relative to the elongated plank portion along the first direction between a reset position, where the movable seat abuts against one of the positioning members, and a normal position, where the movable seat abuts against the other one of the positioning members. The movable seat has a second measuring portion spaced apart from the first measuring portion of the ruler unit. The resilient member is mounted between the movable seat and the ruler unit, and biases the movable seat toward the normal position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
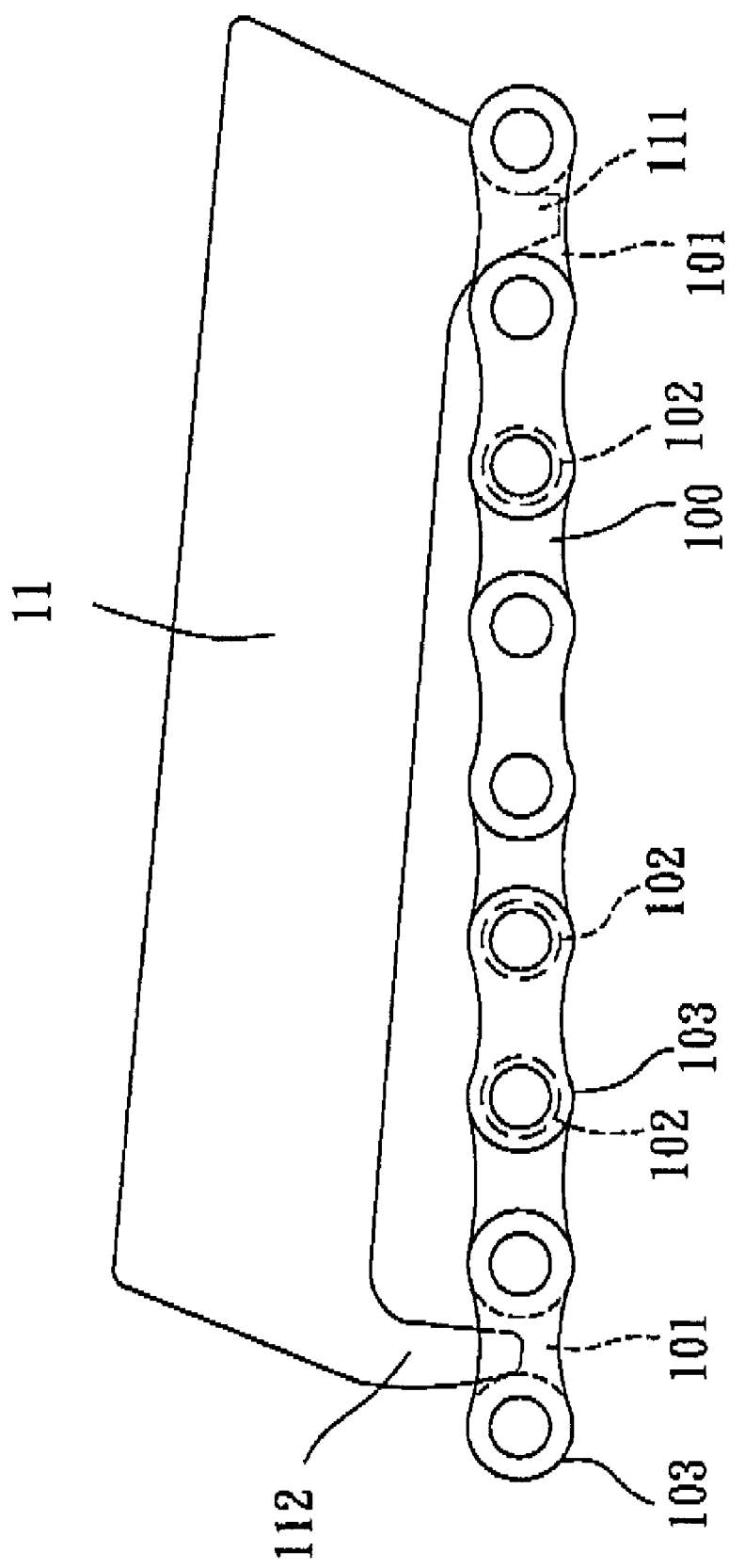
FIG. 1 is a schematic side view of a conventional measuring instrument adapted to measure the length of a chain segment of a chain.
Figure 2:
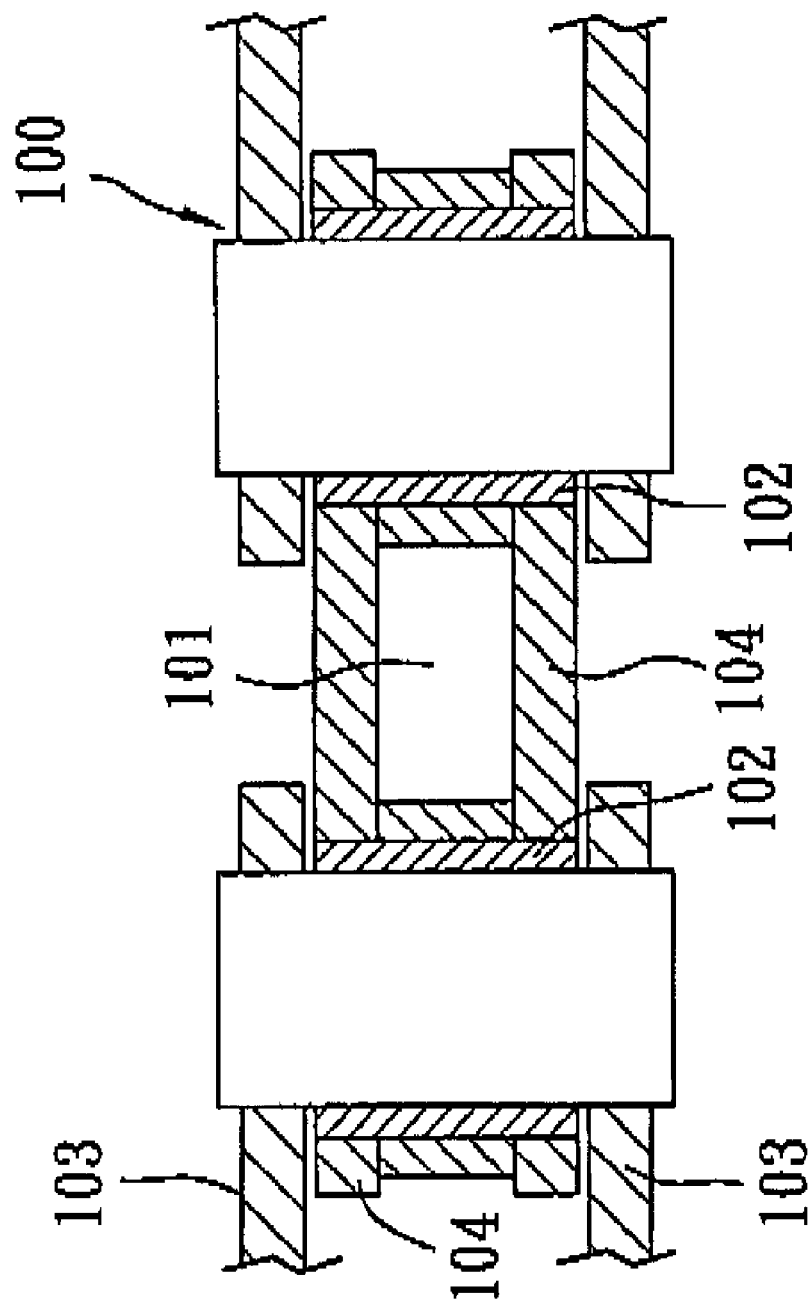
FIG. 2 is a fragmentary top view of the chain, illustrating a plurality of chain rollers each extending through two outer chain plates and two inner chain plates.
Figure 3:
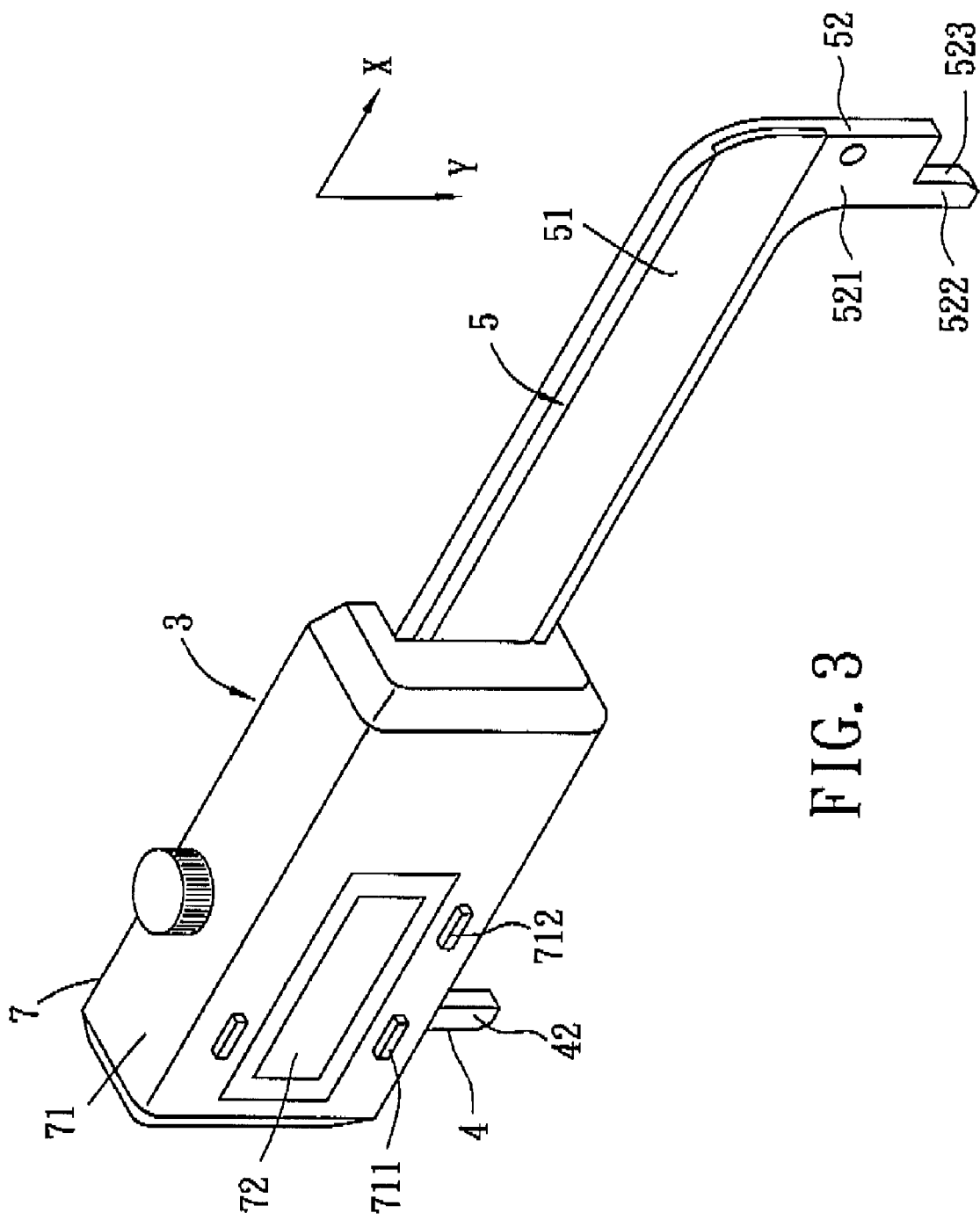
FIG. 3 is a front perspective view of a preferred embodiment of a measuring instrument according to the present invention.
Figure 4:
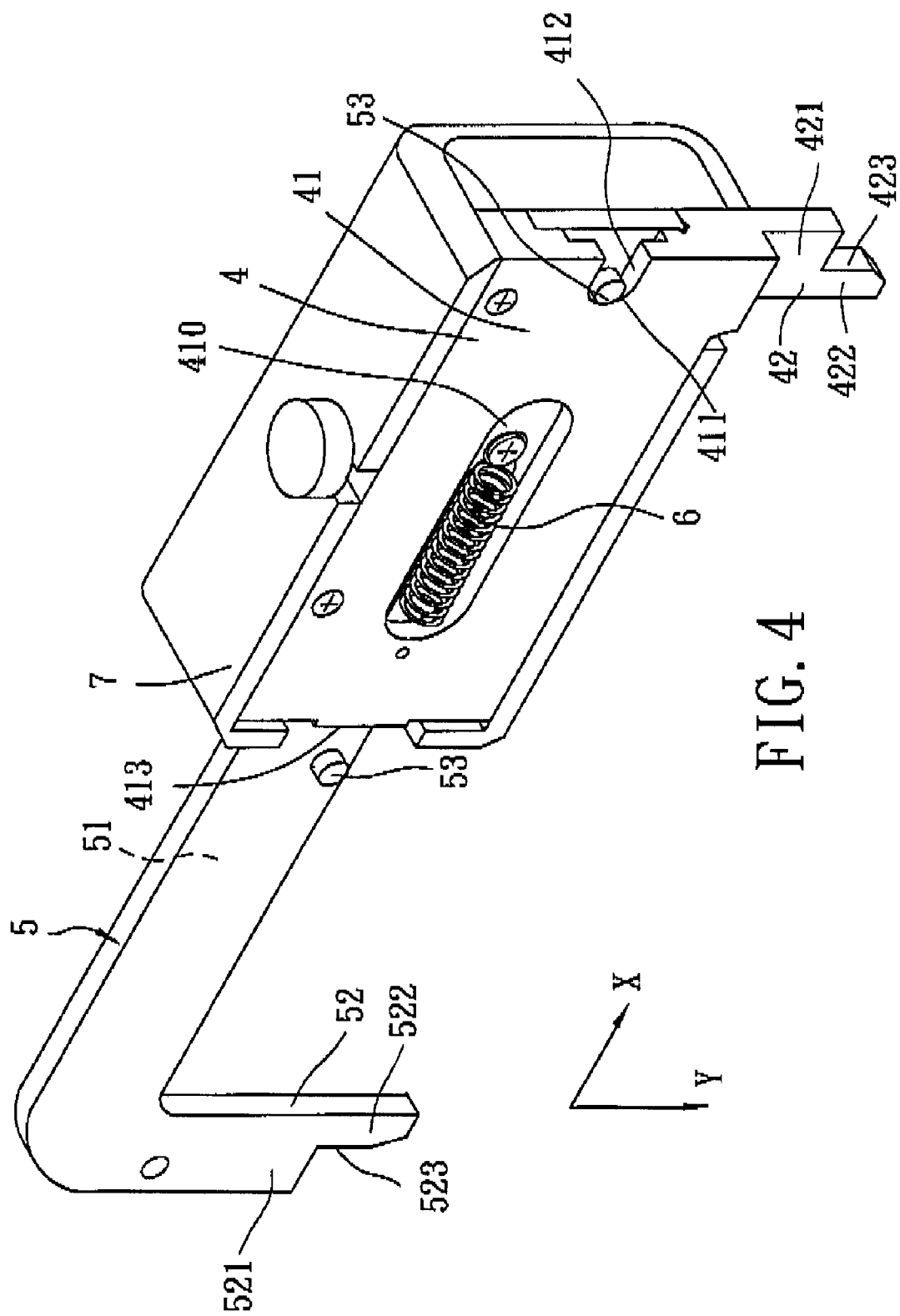
FIG. 4 is a rear perspective view of the preferred embodiment of the measuring instrument.
Figure 5:
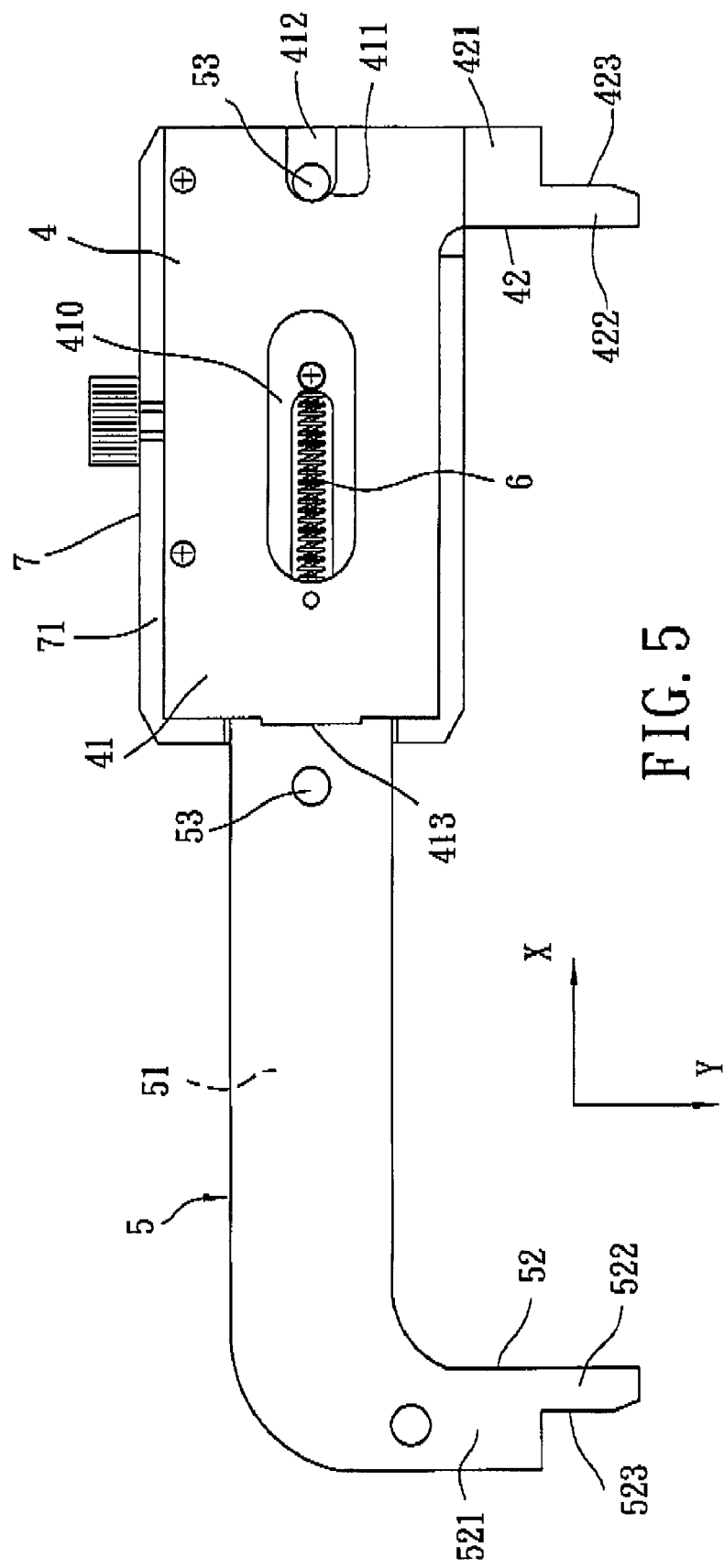
FIG. 5 is a rear view of the preferred embodiment, illustrating a movable seat disposed at a normal position.
Figure 7:
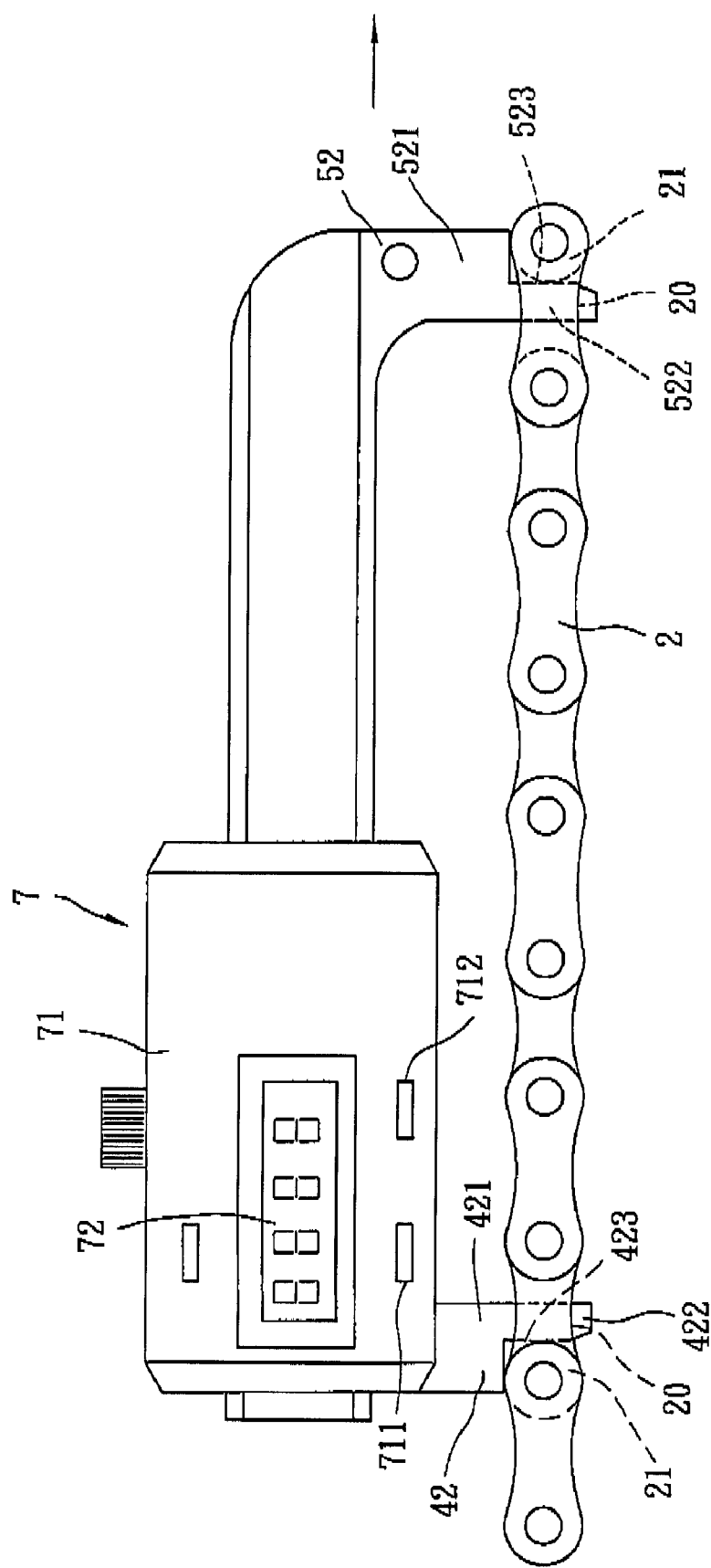
FIG. 7 is a front view of the preferred embodiment and a chain segment of a chain, illustrating how the length of the chain is measured by use of the measuring instrument.

Referring to FIGS. 3 to 5, a preferred embodiment of a measuring instrument 3 adapted for measuring a chain 2 (only a chain segment thereof is shown in FIG. 7) according to the present invention is shown. The chain 2 has a plurality of spaced apart meshing spaces 20 (see FIG. 7) for meshing with a sprocket (not shown). The measuring instrument 3 comprises a ruler unit 5, a movable seat 4, a resilient member 6, and an indicating unit 7.

The ruler unit 5 includes an elongated plank portion 51 extending along a first direction (X) (i.e., a left-to-right direction), two spaced apart positioning members 53 disposed fixedly on the elongated plank portion 51, and a first measuring portion 52 extending from the elongated plank portion 51 along a second direction (Y) different from the first direction (X). The first measuring portion 52 of the ruler unit 5 has a connecting segment 521 extending from the elongated plank portion 51 along the second direction (Y), and a measuring segment 522 that extends from the connecting segment 521 of the first measuring portion 52 away from the elongated plank portion 51 along the second direction (Y), and that has a width smaller than that of the connecting segment 521 of the first measuring portion 52.

The movable seat 4 is movably mounted on the elongated plank portion 51 and is movable relative to the elongated plank portion 51 along the first direction (X) between a reset position (see FIG. 6), where the movable seat 4 abuts against one of the positioning members 53, and a normal position (see FIG. 5), where the movable seat 4 abuts against the other one of the positioning members 53. The movable seat 4 has a second measuring portion 42 spaced apart from the first measuring portion 52 of the ruler unit 5. The second measuring portion 42 has a seat body 41 movably mounted on the elongated plank portion 51 and disposed on a side surface of the elongated plank portion 51. The second measuring portion 42 further has a connecting segment 421 extending from the seat body 41 along the second direction (Y) and a measuring segment 422 that extends from the connecting segment 421 away from the seat body 41 along the second direction (Y), and that has a width smaller than that of the connecting segment 421 of the second measuring portion 42. The second measuring portion 42 of the movable seat 4 and the first measuring portion 52 of the ruler unit 5 have two measuring datum surfaces 423, 523 that face away from each other, and that are located respectively at the measuring segments 522, 422 of the first measuring portion 52 and the second measuring portion 42, respectively.

The seat body 41 has a concave surface 411 and a convex surface 413 opposite to the concave surface 911. The concave surface 411 defines a notch 412. When the movable seat 4 is disposed at the normal position (see FIG. 5), one of the positioning members 53 of the ruler unit 5 is disposed in the notch 412 and abuts against the concave surface 411. When the movable seat 4 is disposed at the reset position (see FIG. 6), the other one of the positioning members 53 of the ruler unit 5 abuts against the convex surface 413.

The seat body 41 of the movable seat 4 further has a through hole 410 extending along the first direction (X) and formed through the seat body 41. The resilient member 6 is mounted between the movable seat 4 and the ruler unit 5, and biases the movable seat 4 toward the normal position. The resilient member 6 has two ends connected respectively to the elongated plank portion 51 and the seat body 41, and is exposed within the through hole 410. In this preferred embodiment, the resilient member 6 is configured as a coiled compression spring.

The indicating unit 7 includes a measuring member 71 and a display member 72. The measuring member 71 is mounted on the movable seat 4, and generates a measuring signal when the movable seat 4 moves relative to the ruler unit 5. The display member 72 is mounted on the measuring member 71 and displays a value of the measuring signal. The measuring member 71 has a power switch 711 and a reset switch 712. The measuring signal generated by the measuring member 71 is reset and the display member 72 displays a value of zero when the reset switch 712 is pressed. In this preferred embodiment, the measuring member 71 is a resistance-type measuring member.

Figure 6:
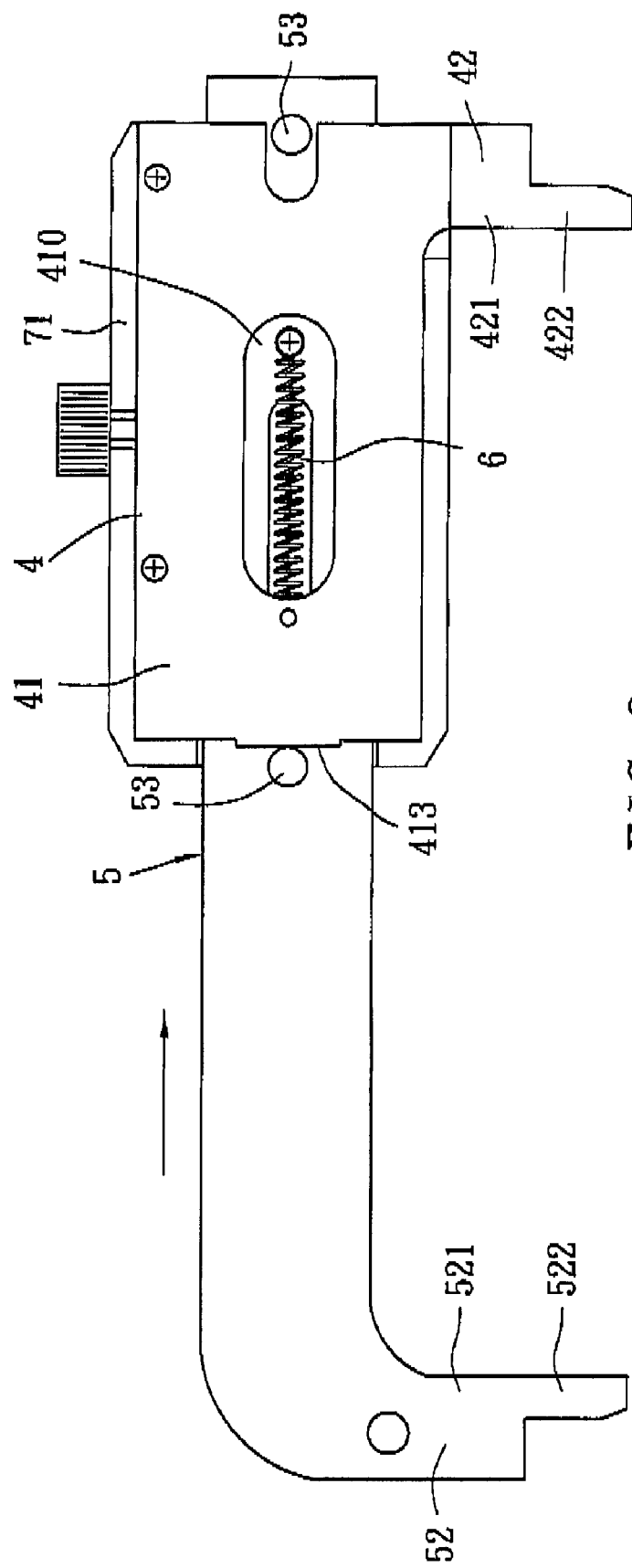
FIG. 6 is a rear view of the preferred embodiment, illustrating the movable seat disposed at a reset position.

Further referring to FIGS. 6 and 7, when it is desired to measure the chain 2 (see FIG. 7), the measuring member 71 is first turned on by pressing the power switch 711. Next, an external force is applied to the movable seat 4 and the ruler unit 5 to force the movable seat 4 to move relative to the ruler unit 5, and the first and second measuring portions 52, 42 are moved toward each other until the convex surface 413 of the seat body 41 abuts against the positioning member 53 which is disposed adjacent to a right end of the seat body 41. A left-to-right direction is the first direction (X) shown in FIGS. 3 and 7. Hence, the movable seat 4 is moved to the reset position (see FIG. 6).

Afterwards, the reset switch 712 is pressed to reset the measuring signal generated by the measuring member 71, such that the display member 72 displays a value of zero. The measuring segments 522, 422 of the first and second measuring portions 52, 42 are inserted respectively into corresponding meshing spaces 20 of the chain 2, such that the connecting segments 521, 421 of the first and second measuring portions 52, 42 abut against outer surfaces of corresponding ones of the chain rollers 21 (see FIG. 6). In this preferred embodiment, the measuring segments 522, 422 are inserted respectively into a first one and an eighth one of consecutive meshing spaces 20 of the chain 2.

Subsequent to insertion of the first and second measuring portions 52, 42, the external force is released, such that the resilient member 6 biases the movable seat 4 from the reset position toward the normal position. In the meantime, the measuring member 71 generates the measuring signal, and the display member 72 displays the value of the measuring signal to represent a change in total length of the chain 2. The length tolerance of the chain 2 is 0.8 mm. Therefore, when the value of the measuring signal is larger than 0.8 mm, the measured chain should be replaced; when the value of the measuring signal is not larger than 0.4 mm, the measured chain is usable; when the value of the measuring signal is larger than 0.4 mm and smaller than 0.8 mm, the measured chain is usable but should be measured once again within a shorter measurement period.

In this preferred embodiment, when the movable seat 4 moves relative to the ruler unit 5 between the normal position and the reset position along the first direction (X), a change in a distance between the measuring datum surfaces 523, 423 is not larger than 3 mm. It should be noted that, while the measuring segments 522, 422 are straight in this embodiment, they may be curved in other embodiments of this invention. Advantageously, it is convenient to replace the resilient member 6 due to the presence of the through hole 410. However, it should be noted that the through hole 410 can be omitted in other embodiments.

To sum up, the advantages of the measuring instrument according to the present invention are as follows. In the present invention, the movable seat 4 is movable relative to the ruler unit 5, and the indicating unit 7 is driven by the movable seat 4 to display a value of the measuring signal that represents a change in length of the chain 2. Therefore, it is convenient for users to realize the change in length of the chain 2, and to make a timely replacement of the chain 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A measuring instrument comprising:
   a ruler unit including an elongated plank portion extending along a first direction, two spaced apart positioning members disposed fixedly on said elongated plank portion, and a first measuring portion extending from said elongated plank portion along a second direction different from the first direction;
   a movable seat movably mounted on said elongated plank portion and movable relative to said elongated plank portion along the first direction between a reset position, where said movable seat abuts against one of said positioning members, and a normal position, where said movable seat abuts against the other one of said positioning members, said movable seat having a second measuring portion spaced apart from said first measuring portion of said ruler unit; and
   a resilient member mounted between said movable seat and said ruler unit, and biasing said movable seat toward the normal position.

2. The measuring instrument as claimed in claim 1, further comprising an indicating unit, said indicating unit including a measuring member that is mounted on said movable seat, and that generates a measuring signal when said movable seat moves relative to said ruler unit, and a display member mounted on said measuring member and displaying a value of the measuring signal.

3. The measuring instrument as claimed in claim 2, wherein said measuring member has a reset switch, the measuring signal generated by said measuring member being reset and said display member displaying a value of zero when said reset switch is pressed.

4. The measuring instrument as claimed in claim 2, wherein said movable seat further has a seat body disposed on a side surface of said elongated plank portion, said seat body having a concave surface that defines a notch such that when said movable seat is disposed at the normal position, one of said positioning members of said ruler unit is disposed in said notch and abuts against said concave surface.

5. The measuring instrument as claimed in claim 4, wherein said seat body further has a convex surface opposite to said concave surface, the other one of said positioning members of said ruler unit abutting against said convex surface when said movable seat is disposed at the reset position.

6. The measuring instrument as claimed in claim 5, wherein said seat body further has a through hole extending along the first direction and formed through said seat body, said resilient member having two ends connected respectively to said elongated plank portion and said seat body, and exposed within said through hole.

7. The measuring instrument as claimed in claim 1, wherein said second measuring portion of said movable seat and said first measuring portion of said ruler unit have two measuring datum surfaces that face away from each other, respectively.

8. The measuring instrument as claimed in claim 7, wherein said second measuring portion of said movable seat has a seat body movably mounted on said elongated plank portion, a connecting segment extending from said seat body along the second direction, and a measuring segment that extends from said connecting segment away from said seat body along the second direction, and that has a width smaller than that of said connecting segment of said second measuring portion, said first measuring portion of said ruler unit having a connecting segment extending from said elongated plank portion along the second direction and a measuring segment that extends from said connecting segment of said first measuring portion away from said elongated plank portion along the second direction, and that has a width smaller than that of said connecting segment of said first measuring portion, said measuring datum surfaces of said first measuring portion and said second measuring portion being located at said measuring segments of said first measuring portion and said second measuring portion, respectively.

9. The measuring instrument as claimed in claim 7, wherein, when said movable seat moves relative to said ruler unit between the normal position and the reset position along the first direction, a change in a distance between said measuring datum surfaces is not larger than 3 mm.

10. The measuring instrument as claimed in claim 1, being adapted to measure a chain that has a plurality of meshing spaces, wherein said second measuring portion of said movable seat and said first measuring portion of said ruler unit are adapted to be inserted respectively into a first one and an eighth one of consecutive meshing spaces of the chain.

\* \* \* \* \*